United States Patent
Avci et al.

(10) Patent No.: US 10,003,538 B2
(45) Date of Patent: Jun. 19, 2018

(54) PROACTIVE LOAD BALANCING BASED ON FRACTAL ANALYSIS

(71) Applicant: Futurewei Technologies, Inc., Plano, TX (US)

(72) Inventors: Serhat Nazim Avci, Milpitas, CA (US); Zhenjiang Li, San Jose, CA (US); Fangping Liu, Plano, TX (US)

(73) Assignee: Futurewei Technologies, Inc., Plano, TX (US)

( * ) Notice: Subject to any disclaimer, the term of this patent is extended or adjusted under 35 U.S.C. 154(b) by 198 days.

(21) Appl. No.: 15/177,020

(22) Filed: Jun. 8, 2016

(65) Prior Publication Data
US 2017/0359261 A1 Dec. 14, 2017

(51) Int. Cl.
*H04L 12/803* (2013.01)
*H04L 12/721* (2013.01)
*H04L 12/801* (2013.01)
*H04L 25/03* (2006.01)

(52) U.S. Cl.
CPC ............ *H04L 47/125* (2013.01); *H04L 45/70* (2013.01); *H04L 47/127* (2013.01); *H04L 25/03101* (2013.01)

(58) Field of Classification Search
None
See application file for complete search history.

(56) References Cited

U.S. PATENT DOCUMENTS

| 8,787,400 | B1 | 7/2014 | Barth et al. | |
|---|---|---|---|---|
| 9,042,234 | B1* | 5/2015 | Liljenstolpe | H04L 45/00 370/238 |
| 2003/0130819 | A1* | 7/2003 | Stewart | H04L 41/0896 702/182 |
| 2009/0303880 | A1 | 12/2009 | Maltz et al. | |
| 2013/0308455 | A1* | 11/2013 | Kapadia | H04L 47/125 370/235 |
| 2017/0099224 | A1* | 4/2017 | O'connor | H04L 47/125 |

OTHER PUBLICATIONS

Ghorbani, Mahboobeh, et al., "Prediction and Control of Bursty Cloud Workloads: A Fractal Framework," ESWEEK, Oct. 12-17, 2014, 9 pages.
Stolojescu, Cristina, et al., "A Wavelet Based Prediction Method for Time Series," [downloaded on Apr. 12, 2016 from www.tc.etc.upt.ro/docs/cercetare/articole/..], Jan. 2010, 8 pages.
(Continued)

*Primary Examiner* — Christine Duong
(74) *Attorney, Agent, or Firm* — Vierra Magen Marcus LLP

(57) ABSTRACT

The disclosure relates to technology for load balancing link utilization of a networking device based on fractal analysis. In one embodiment, link utilization of switches, routers, etc. in a data center is balanced based on a fractal model of the link utilization. Techniques disclosed herein are proactive. For example, instead of reacting to link congestion, the technique predicts future link utilization based on fractal analysis. Then, packet flows (or flowlets) may be assigned to links based on the predicted future link utilization. Hence, congestion on links may be reduced or prevented.

21 Claims, 10 Drawing Sheets

(56) References Cited

OTHER PUBLICATIONS

Bogdan, Paul, "Mathematical Modeling and Control of Multifractal Workloads for Data-Center-on-a-Chip Optimization," NOCS, Sep. 28-30, 2015, 8 pages.

Lapukhov, P., et al., "Use of BGP for routing in large-scale data centers draft-ieft-rtgwg-bgp-routing-large-dc-10," Routing Area Working Group, Arista Networks, [downloaded on May 23, 2016 from https://datatracker.ietf.org/doc/draft-ietf-rtgwg-bgp-routing-large-dc/], Apr. 27, 2016, 34 pages.

Abry, Patrice, et al., "Multiscale Nature of Network Traffic," IEEE Signal Processing Magazine, May 2002, 19 pages.

Vieira, Flavio, H.T., et al., "A network traffic prediction approach based on multifractal modeling," Journal of High Speed Networks 17, Apr. 2010, 14 pages.

Abry, Patrice, et al., "The Multiscale Nature of Network Traffic: Discovery, Analysis, and Modeling," IEEE Signal Processing Magazine, May 2005, 16 pages.

Shu, Yantai, et al., "Traffic Prediction Using FARIMA Models," IEEE International Conference on Communications, Jun. 1999, 5 pages.

Zhao Hong, et al. "Wavelet Transform-based Network Traffic Prediction: A Fast On-line Approach," Journal of Computing and Information Technology, Jun. 2012, 12 pages.

* cited by examiner

PROACTIVE LOAD BALANCING BASED ON FRACTAL ANALYSIS

BACKGROUND

Load balancing can be used to distribute a workload across multiple computing devices such that the same amount of work can be performed more efficiently. As one example, a load balancer can be a network device that distributes network traffic across a number of links or paths.

Techniques such as equal cost multi-path (ECMP) routing could be used to load balance. In one ECMP technique, flow related data in the packet headers is hashed in order to distribute incoming flows equally over egress ports. That is, the hash result dictates which egress port is selected. The hashing is expected to result in an equal distribution of the flows to egress ports.

A problem with some ECMP techniques is that there can be different sizes between the flows. Hash collisions could potentially cause significant imbalance if there are a few large flows. This means that at least for some short time frames there could be low utilization of some ports and high utilization of other egress ports. In other words, over a long enough time frame, the load may be balanced between the various egress ports. However, utilization can be imbalanced over short time frames.

BRIEF SUMMARY

In one embodiment, an apparatus has logic that is configured to access link statistics for a plurality of time periods. Separate link statistics are accessed for each of a plurality of egress ports of a networking device. The logic is configured to predict a future link statistic for each of the plurality of egress ports based on a separate fractal analysis of the link statistics for each of the egress ports. The logic is configured to balance a load at the egress ports based on the predicted future link statistics for the respective egress ports.

One embodiment includes a method of load balancing. The method comprises accessing link statistics for egress ports of a networking device. The link statistics for each of the egress ports is based on traffic rates at the respective egress port for each of a plurality of recent time periods. The method also includes predicting a future link statistic for each of the plurality of egress ports by applying a separate fractal analysis to the link statistics for each of the egress ports. The future link statistic is for a time period that immediately follows the plurality of recent time periods. The method also includes balancing a load at the plurality of egress ports based on the predicted future link statistic for each of the plurality of egress ports.

One embodiment includes a networking device comprising ingress ports, egress ports, fractal based analyzer logic, and load balancer logic. The ingress ports are configured to receive traffic flows. The fractal based analyzer logic is configured to predict a traffic rate for each of the plurality of egress ports based on recent traffic rates at the respective egress ports. The load balancer logic is configured to forward the traffic flows received on the ingress ports over the egress ports based on the predicted traffic rate of the respective egress ports.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

BRIEF DESCRIPTION OF THE DRAWINGS

Aspects of the present disclosure are illustrated by way of example and are not limited by the accompanying figures for which like references indicate elements.

DETAILED DESCRIPTION

The disclosure relates to technology for load balancing link utilization of a networking device based on fractal analysis. In one embodiment, link utilization of switches, routers, etc. in a data center is balanced based on a fractal analysis of link statistics. Techniques disclosed herein are proactive. For example, instead of reacting to link congestion, the technique predicts future link statistics based on a fractal model. Then, packet flows (or flowlets) may be assigned to links based on the predicted future link statistics. Hence, congestion on links may be reduced or prevented.

It can be difficult to accurately model traffic on egress ports of networking devices in, for example, a data center. For example, traffic modeling techniques that work well for Internet traffic may not work well in, for example, a switch in a data center. For example, techniques such as Markoff modeling or Poisson distribution might be suitable for modeling some traffic flows. However, the inventors have discovered that such techniques may not work well for link utilization in, for example, a data center. Data center network traffic may show long range dependency character.

In some embodiment, the link statistics that are analyzed comprise a time series that is based on a traffic rate at an egress port of a networking device. Fractal analysis is useful to characterize stochastic processes, such as the aforementioned time series, and predict future values of the time series. Thus, fractal analysis can be used to predict a future traffic rate on the egress port.

Fractals are patterns that are self-similar across different scales. In the case of link statistics, the link statistics may be self-similar across different time scales. Hence, link statistics may possess fractal characteristics. Fractal analysis is related to fractional calculus, which deals with integrals and derivatives of non-integer order. Fractional calculus is pertinent to processes that possess memory, are non-smooth, or are non-differentiable.

Figure 1A:
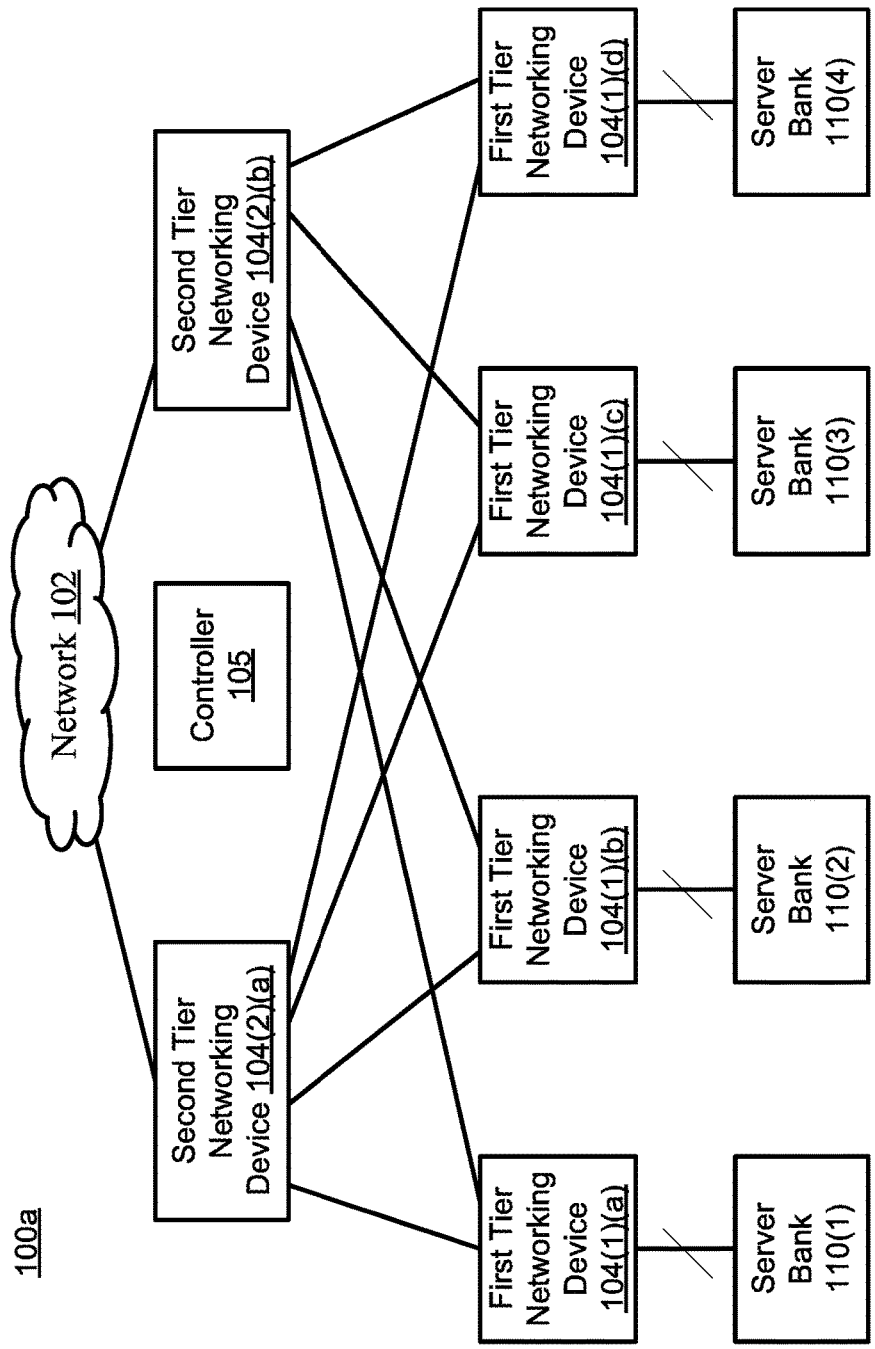
FIG. 1A is a diagram of an example environment in which embodiments may be practiced.

FIG. 1A is a diagram of an example environment in which embodiments may be practiced. FIG. 1A shows one possible topology for a data center 100a. The data center 100a includes server banks 110(1)-110(4), first tier networking devices 104(1)(a)-104(1)(d), second tier networking devices 104(2)(a), 104(2)(b), and network 102. FIG. 1A also depicts controller 105, which is optional. In one embodiment, fractal analysis of link statistics at ports of first tier networking devices 104(1)(a)-104(1)(d) is used to load balance on those ports. In one embodiment, fractal analysis of link statistics at ports of second tier networking devices 104(2)(a), 104(2)(b) is used to load balance on those ports.

As the term is used herein, "link statistics" could include, but is not limited to, a traffic rate or a link utilization. A traffic rate may be defined in terms of an amount of data per unit time (e.g., bits per second). Link utilization refers to the percentage of the port's bandwidth that is being used. Thus, fractal analysis is based on traffic rates at ports of networking devices 104, in one embodiment. Fractal analysis is based on link utilization at ports (or links) of networking devices 104, in one embodiment.

Each server bank 110(1)-110(5) has a number of servers. A server bank may also contain data storage. Each server bank 110(1)-110(5) could be a rack of servers, a row of servers, or some other configuration. There can be any number of server banks 110. The individual servers are not depicted in FIG. 1A.

First tier networking devices 104(1)(a)-104(1)(d) provide access to server banks 110(1)-110(4). Specifically, first tier networking device 104(1)(a) provides access to server bank 110(1), first tier networking device 104(1)(b) provides access to server bank 110(2), first tier networking device 104(1)(c) provides access to server bank 110(3), and first tier networking device 104(1)(d) provides access to server bank 110(4), in this example. The connection between each of the first tier networking device 104(1) and its server bank 110 has a slash to indicate that there are actually multiple connections. For example, there may be one connection (or link) for each server in the server bank 110. First tier networking devices 104(1)(a)-104(1)(d) could be switches or routers. Thus, first tier networking devices 104(1)(a)-104(1)(d) could be Layer 2 or Layer 3 devices, with respect to an Open Switch Interconnection (OSI) model.

Each of the first tier networking devices 104(1)(a)-104(1)(d) is connected to one or more of the second tier networking devices 104(2)(a), 104(2)(b). The links between the first tier networking devices 104(1) and second tier networking devices 104(2) may be switched or routed. In one embodiment, each of the first tier networking devices 104(1) is connected to each of the second tier networking devices 104(2) (as depicted in FIG. 1). However, it is not required for each first tier networking device 104(1) to be connected to each second tier networking device 104(2). Second tier networking devices 104(2)(a), 104(2)(b) could be switches or routers. Thus, second tier networking devices 104(2)(a), 104(2)(b) could be Layer 2 or Layer 3 devices. Note that there could be additional second tier networking devices 104(2). Hence, each of the first tier networking devices 104(1) could be connected to more than two second tier networking devices 104(2).

The second tier networking devices 104(2) each provide access to network 102. In one embodiment, network 102 is the Internet. The second tier networking device 104(2) could also provide access to other parts of the data center 100a. Hence, second tier networking devices 104(2) could have additional ports not depicted in FIG. 1A.

As noted, the controller 105 is optional. In one embodiment, the controller 105 uses fractal analyses to load balance in the data center 100a. The controller 105 may receive link statistics (e.g., traffic rates, link utilization) from one or more of the first tier networking device 104(1) and/or one or more of the second tier networking devices 104(2). In one embodiment, the link statistics are time series data. For example, there may be a link statistic for each of a number of time periods. In one embodiment, the time periods are each the same time length. The controller 105 may use fractal analysis to predict a future link statistic (e.g., traffic rate, link utilization) at ports of the networking devices 104(1) and/or 104(2). The controller 105 may send control information to the networking devices 104(1) and/or 104(2) to load balance packet flows (or alternatively flowlets) at the ports. In this manner, the controller 105 may balance a load at egress ports of a networking device 104 based on predicted future link statistics for the respective egress ports. To simplify the diagram, connections between the controller 105 and networking device 104(1), 104(2) are not depicted. Also note that there may be more than one controller 105.

In one embodiment, a first tier networking device 104(1) has logic therein to perform fractal analyses of link statistics for at least some of its ports (e.g., egress ports). Thus, the first tier networking device 104(1) may be able to make its own prediction of future link statistics of its ports based on the fractal analyses. The first tier networking device 104(1) may then load balance packet flows (or alternatively flowlets) over egress ports for packet flows received on ingress ports.

In one embodiment, a second tier networking device 104(2) has logic therein to perform fractal analyses of link statistics for at least some of its ports (e.g., egress ports), as well as load balance based on the fractal analyses.

In the example embodiment of FIG. 1A, the data center 100a has a leaf/spine topology. In a leaf/spine topology, first tier networking devices 104(1)(a)-104(1)(d) reside at a leaf layer and may be referred to as leaf nodes. In the leaf/spine topology, second tier networking devices 106(1)-106(2) reside at a spine layer and may be referred to as spine nodes. The links between the leaf layer and spine layer may be switched or routed. Thus, networking devices 104(1)(a)-104(1)(d) at a leaf layer may be Layer 2 or Layer 3 devices, with reference to an OSI model. Likewise, the networking devices 104(1)(a)-104(1)(d) may be switches or routers.

Figure 1B:
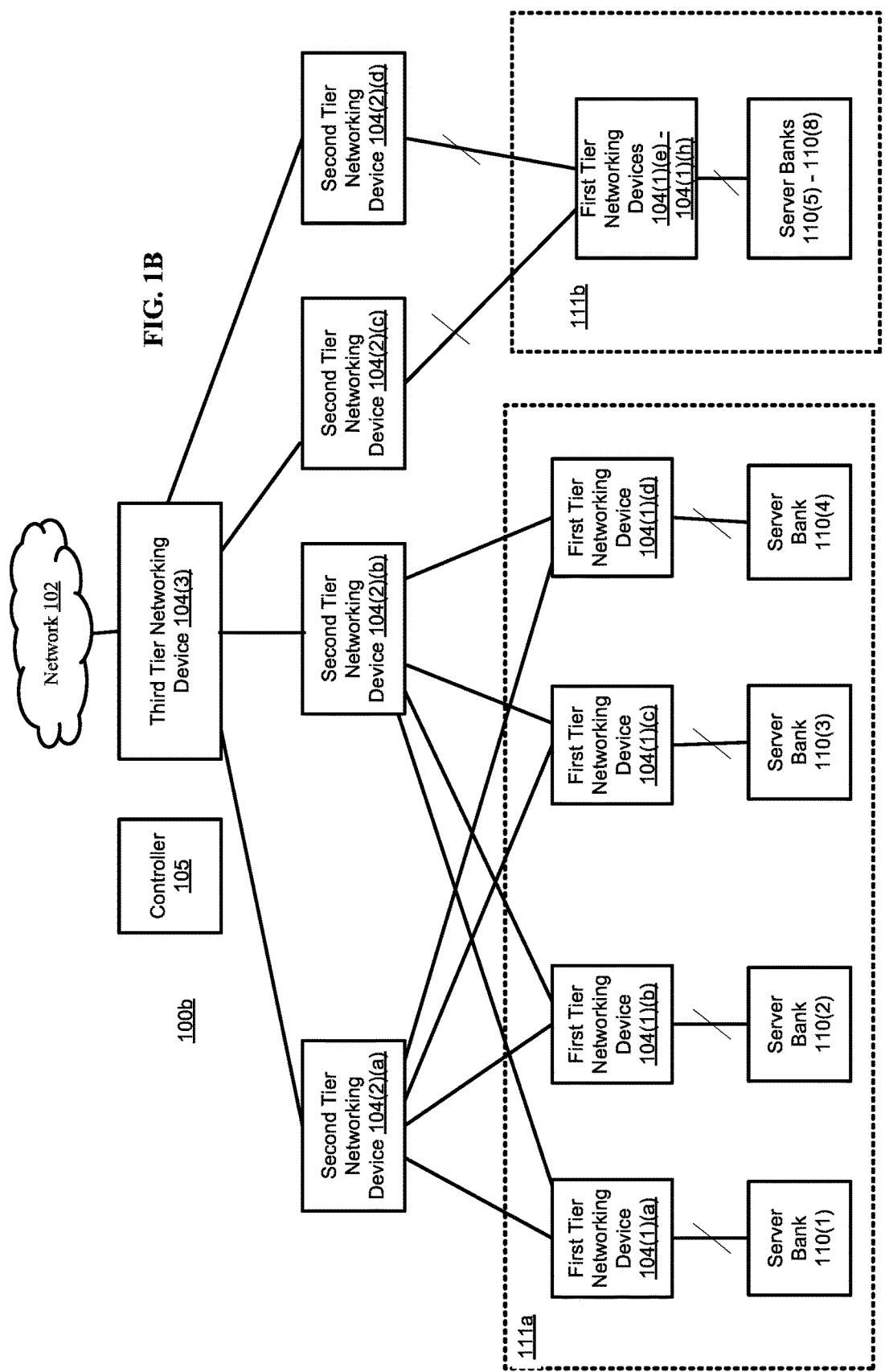
FIG. 1B is a diagram of a possible topology for a data center in which embodiments may be practiced.

In the example of FIG. 1A, each server (in a given server bank 110) is four hops from another server in a different server bank 110. This is due to the mesh structure of the connections between the leaf and spine nodes. However, it is not required to have exactly four hops from each server (in a given server bank 110 and another server in a different server bank. Also, it is not required to have the same number of hops between each server. FIG. 1B, to be discussed below, shows one such option.

The number of server banks 110, first tier networking devices 104(1) and second tier networking devices 104(2) is for purpose of illustration. There could be more or fewer server banks 110, more or fewer first tier networking devices 104(1), and more or fewer second tier networking devices 104(2). Thus, note that there could be many more connections than are depicted in FIG. 1A.

FIG. 1B is a diagram of another possible topology for a data center 100b in which embodiments may be practiced. Whereas the topology of FIG. 1A has two tiers, the topology of FIG. 1B has three tiers. The example data center 100b includes a third tier network device 104(3) at the third tier. Although only a single third tier network device 104(3) is depicted, there could be more. Another difference between the two diagrams is the addition of second tier networking devices 104(2)(c) and 104(2)(d), first tier networking devices 104(1)(e)-104(1)(h), and servers 110(5)-110(8). First tier networking devices 104(1)(e)-104(1)(h) and servers 110(5)-110(8) are labeled as group 111b. First tier networking devices 104(1)(a)-104(1)(d) and servers 110(a)-110(4) are labeled as group 111a. The connections between servers 110 and first tier networking devices 104 in the two groups 111a, 111b may have a similar topology; however, the connections in group 111b are not depicted to simplify the diagram. The connections between first tier networking devices 104(1) in the two groups 111a, 111b to the respective second tier networking devices 104(2) may have a similar topology; however, the connections for group 111b are not depicted to simplify the diagram. Also note that there could be additional connections, such as connections between two first tier networking devices 104(1) or between two second tier networking devices 104(2). In the example in FIG. 1B, there may be a different number of hops between some of the servers 110, although that is not required.

The third tier network device 104(3) is connected to second tier networking devices 104(2)(a),104(2)(b), 104(2)(c) and 104(2)(d). This allows traffic to flow between groups 111a and 111b. The third tier networking device 104(3) may also provide access to network 102. In one embodiment, network 102 is the Internet. Third tier networking device 104(3) could be a switch or router. Thus, third tier networking device 104(3) could be a Layer 2 or Layer 3 device in an OSI model.

In one embodiment, fractal analysis of link statistics at ports of first tier networking devices 104(1)(a)-104(1)(h) is used to load balance on those ports. In one embodiment, fractal analysis of link statistics at ports of second tier networking devices 104(2)(a)-104(2)(d) is used to load balance on those ports. In one embodiment, fractal analysis of link statistics at ports of third tier networking device 104(3) is used to load balance on those ports.

The controller 105 in FIG. 1B is optional. In one embodiment, the controller 105 in FIG. 1B uses fractal analyses to load balance in the data center 100b. In one embodiment, a first tier networking device 104(1) has logic therein to perform fractal analyses of link statistics for at least some of its ports (e.g., egress ports). In one embodiment, a second tier networking device 104(2) has logic therein to perform fractal analyses of link statistics for at least some of its ports (e.g., egress ports). In one embodiment, a third tier networking device 104(3) has logic therein to perform fractal analyses of link statistics for at least some of its ports (e.g., egress ports).

In the embodiment of FIG. 1B, the data center 100b may have a hierarchical tree topology. In a hierarchical tree topology, first tier networking devices 104(1)(a)-104(1)(h) reside at an access layer, second tier networking devices 104(2)(a)-104(2)(d) reside at an aggregation layer, third tier networking device 104(3) resides at a core layer. The aggregation layer could also be referred to as a distribution layer. Note that the tiers in FIG. 1B could be referred to using different terminology than access layer, aggregation layer, and core layer.

FIGS. 1A and 1B give two examples of topologies for data centers in which embodiments of fractal analysis based load balancing may be performed. Embodiments of fractal based load balancing are not limited to these two example topologies. Other possible topologies for the data center 100 include, but are not limited to, clos-based, server-centric, mesh-based, and torus-based topologies. Such topologies are not limited to a particular number of tiers. Embodiments of fractal analysis based load balancing are not limited to use in data centers.

There may be both parallel and sequential relationships between data flows in the data center 100. For example, it is possible for an application to rely on two computations from servers in different server banks 110. In some cases, the two computations could be carried out in parallel. However, if one computation is slow, the application will have to wait anyway if the result of the other computation is delayed. In some cases, a chain of computations may rely upon another being performed first. Hence, all it takes is one of the computations to be delayed for the process to be slowed. Hence, even if a small percentage of the traffic flow is slow, application performance can be negatively impacted. Thus, minimizing traffic delays is important.

Note that the example data centers 100 are highly connected. This allows for multiple routes to be taken between servers. In some cases the routes are equal cost. Equal cost refers to multiple routes (or paths) that tie for a top place in routing metric calculations. However, it is not required that all routes be equal cost. Hence, many possibilities exist for determining a path for traffic flows.

Figures 2A, 2B:
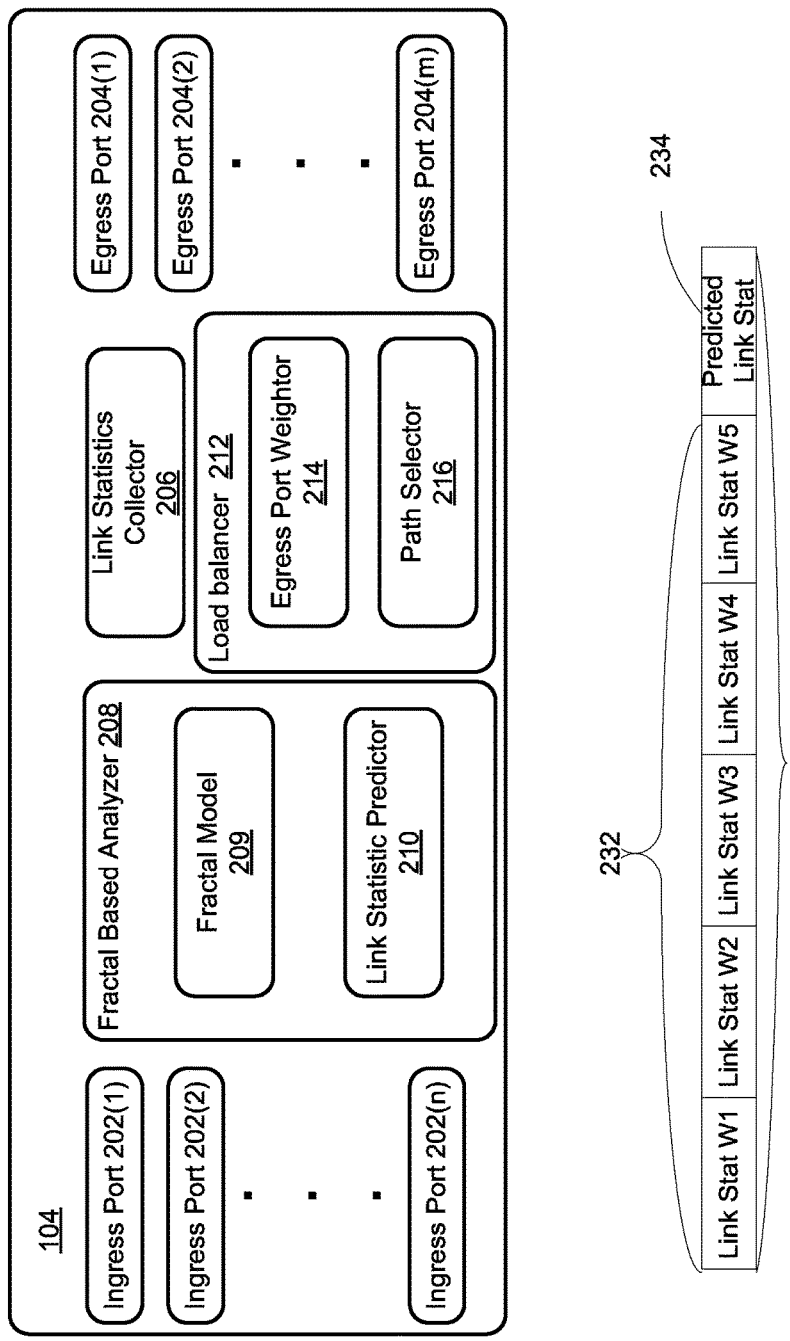
FIG. 2A is a block diagram of one embodiment of a networking device.
FIG. 2B shows an example time series of link statistics.

FIG. 2A is a block diagram of one embodiment of a networking device 104. The networking device 104 may be used in the example data centers 100a, 100b of FIGS. 1A and 1B, respectively. The networking device 104 could be used for any of the first tier networking devices 104(1), second tier networking devices 104(2), or third tier networking device 104(3). The networking device 104 may be a network switch, which may be a hardware device for making data connections among devices. Network switch may be employed to receive, process and forward data packets to their intended destination according to specific flow management protocols (or called data forwarding protocols).

Networking device 104 includes ingress ports 202(1)-202(n), egress ports 204(1)-204(m), link statistics collector 206, fractal based analyzer 208, and load balancer 212. Fractal based analyzer 208 has a fractal model 209 and link statistic predictor 210. Load balancer 212 has egress port weightor 214, and path selector 216. In one embodiment, networking device 104 balances a load at its egress ports based on predicted future link statistics for the respective egress ports.

Link statistics collector 206 provides link statistics for the egress ports 204 to the fractal based analyzer 208. Separate link statistics may be sent for each egress port 204. The link statistics may be based on traffic rates at the egress ports 204. The link statistics could include an average of a traffic rate at a certain egress port 204 over a certain time period. One example of traffic rate is the number of bits output by an egress port 204 per unit time. The link statistics could be an average link utilization for that time period, as another example In one embodiment, link statistics collector 206 provides the fractal based analyzer 208 with a new traffic rate (or alternatively, link utilization) for each egress port 204 periodically. For example, link statistics collector 206 may send a traffic rate to fractal based analyzer 208 every x milliseconds.

The fractal based analyzer 208 takes the link statistics from each egress port 204 and predicts a future link statistic for each egress port 204, based on fractal analysis of the link statistics. The fractal based analyzer 208 includes a fractal model 209 and link statistic predictor 210.

The fractal model 209 may be a mathematical equation with various coefficients and/or parameters. The coefficients and/or parameters may be adapted to accurately predict the future link statistic. In one embodiment, the coefficients and/or parameters are dynamically adjusted during the prediction process. For example, coefficients and/or parameters may be adjusted to reduce an error between a predicted link statistic and an actual link statistic (once an actual value for predicted time is accessed). Thus, the fractal model 209 may change over time. There could be one fractal model for each egress port 204. Alternatively, the same fractal model could be used for each egress port 204, assuming that traffic characteristics have sufficient similarity for each egress port 204.

The link statistic predictor 210 may be logic that is configured to apply the link statistics to the fractal model 209 and predict a future link statistic therefrom. The link statistic predictor 210 is configured to predict a future link statistic (e.g., a future traffic rate, a future link utilization, etc.) for the egress ports 204 based on the fractal model 209. Note that the link statistics may comprise a time series. In one embodiment, the link statistic predictor 210 predicts a next value in the aforementioned time series data.

As noted, the link statistics may be a time series. FIG. 2B shows an example time series 230 of link statistics. The time series 230 has one link statistic for each time window (Time Window 1-Time Window 6 in the time line). For example, Link Stat W1 is for Time Window 1, Link Stat W2 is for Time Window 2, Link Stat W3 is for Time Window 3, Link Stat W4 is for Time Window 4, Link Stat W5 is for Time Window 5, and Predicted Link Stat is for Time Window 6. The link statistic collector 206 may provide the fractal based analyzer 208 with Link Stat W1-Link Stat W5. Thus, Link Stat W1-Link Stat W5 may be referred to as actual link statistics 232. There may be more or fewer data points in the time series. Each of the time windows has the same time length, in one embodiment.

Each of Link Stat W1-W5 may be a single data value that summarizes the traffic at the egress port for that time window. For example, Link Stat W1 could calculated as the total bits transferred during Time Window 1 divided by the time length of Time Window 1. Thus, Link Stat W1 could be a traffic rate. As another example, Link Stat W1 could be calculated as the total bits transferred during Time Window 1 divided by the total number of bits that this egress port is capable of transferring during Time Window 1. Thus, Link Stat W1 could be a link utilization. Similar reasoning applies to the other time windows. Note that in some embodiments all of the time windows have the same time length.

Time-series forecasting may be used to collect and analyze recent values for link statistics in order to develop a model describing behavior of the time series. The link statistics are assumed to display self-similar behavior, in one embodiment. Self-similar behavior in this context refers to a time series. A time series is self-similar if it statistically looks the same under magnification at different time scales. The time series data can be characterized by a Hurst exponent (H). The Hurst exponent may be used to characterize the long-term memory of the time series. A high value of the Hurst parameter indicates long term positive auto-correlation. A Hurst exponent between 0.5 and 1 may indicate that a process is long-rage dependent and self-similar. For at least some data center traffic, the Hurst exponent may be between 0.5 and 1. In some cases, the Hurst exponent may be very close to 1. For example, the traffic rate at a single egress port may have a Hurst exponent above 0.8 (although it could be lower). Thus, the traffic rate may be highly self-similar (as well as long-range dependent). The Hurst exponent for all of the traffic at a given networking device may be even higher. The highly self-similar nature of the traffic suggest that fractal analysis may be suitable to predict future traffic rates.

Thus, the fractal based analyzer 208 may predict a next value in the time series 230, based on fractal analysis. For example, based on fractal analysis of Link Stat W1-Link Stat W5, link statistic predictor 210 may generate the Predicted Link Stat 234. Note that the Time Window 6 may immediately follow Time Window 5.

The load balancer 212 may be configured to balance link utilization based on the Predicted Link Stat 234. For example, egress port weightor 214 may be configured to determine a suitable weighting to apply to the egress ports 204 to load balance. The egress port weightor 214 may receive a separate Predicted Link Stat 234 for each egress port 204 from the link statistic predictor 210. The egress port weightor 214 may apply a weighting that is inversely proportional to the Predicted Link Stat 234. For example, egress ports with a higher predicted traffic rate could be assigned a lower weight than those with a lower predicted traffic rate. As another example, egress ports with a higher predicted link utilization could be assigned a lower weight than those with a lower predicted link utilization.

Path selector 216 may be configured to select an egress port 204 to for traffic flows (or flowlets) received at ingress ports 202. Path selector 216 may select an egress port based on the egress port weighting. A flowlet is defined herein as a group of packets in a flow which are separated (from the nearest other packet in the flow) by more than the largest path difference in time.

In one embodiment, there are multiple equal cost paths between different destinations (e.g., server banks). In one embodiment, load balancer 212 uses weighted Equal Cost Multi-path (ECMP) routing. In one embodiment, load balancer 212 has a forwarding/routing table with multiple entries for each destination prefix (which may be an address of a server bank). These different entries may each have an equal cost. The load balancer 212 may select one of the entries based on egress port weighting. The weighting may be based on fractal analysis of traffic at the egress ports. Note that it is not required that load balancing be based on ECMP routing. Thus, not all paths between the egress ports 204 and the destination are required to have the same cost.

In one embodiment, the networking device 104 is used as a first tier networking device 104(1) in FIG. 1A or 1B. Thus, in one embodiment, each of the ingress ports 202 is connected to a server in one of the server banks 110. In this embodiment, the networking device 104 may be referred to as a top of row (TOR) switch. In this embodiment, the networking device 104 could also be referred to as an access switch. In this embodiment, the networking device 104 could also be referred to as a leaf switch. In this embodiment, an egress port 204 may be connected to a second tier networking device 104(2).

In one embodiment, the networking device 104 is used as a second tier networking device 104(2) in FIG. 1A or 1B. Thus, in one embodiment, an ingress ports 202 is connected to a first tier networking device 104(1). In this embodiment, the networking device 104 may be referred to as an aggregation switch. In this embodiment, the networking device 104 could also be referred to as spine switch. In one embodiment, an egress port 204 may be connected to network 102 (see FIG. 1A). In one embodiment, an egress port 204 may be connected to a third tier networking device (see FIG. 1B).

In one embodiment, the networking device 104 is used as a third tier networking device 104(3) in FIG. 1B. Thus, in one embodiment, an ingress ports 202 is connected to a second tier networking device 104(2). In this embodiment, the networking device 104 may be referred to as a cord switch. In one embodiment, an egress port 204 may be connected to network 102 (see FIG. 1B).

The ingress ports 202, as well as the egress ports 204 could connect to other devices than the examples just given.

The link statistics collector 206, fractal based analyzer 208, link statistic predictor 210, load balancer 212, egress port weightor 214, and path selector 216 may be implemented with any combination of hardware or software. For example, an Application Specific Integrated Circuit (ASIC) could be used to implement one or more of link statistics collector 206, fractal based analyzer 208, link statistic predictor 210, load balancer 212, egress port weightor 214, and path selector 216. In one embodiment, networking device 104 has a processor that executes processor executable instructions in order to implement functions of one or more of link statistics collector 206, fractal based analyzer 208, link statistic predictor 210, load balancer 212, egress port weightor 214, and path selector 216. The networking device 104 may have computer readable storage to stores the processor executable instructions. Another option is for the processor executable instructions to be stored elsewhere and provided to the networking device 104. Some of the elements (206, 208, 210, 212, 214, 216) might be implemented with a combination of hardware and software.

In one embodiment, the fractal model 209 is implemented by storing data in a computer readable medium. The data may represent a mathematical equation having various parameters and coefficients. In one embodiment, the fractal model 209 is implemented in hardware by an electronic circuit (e.g., in an analog computer). Parameters and coefficients could be dynamically adjusted by adjusting circuit parameters (e.g., variable resistors), selecting/deselecting various elements in the electronic circuit and/or changing operational parameters (e.g., voltages, currents.).

Figure 2C:
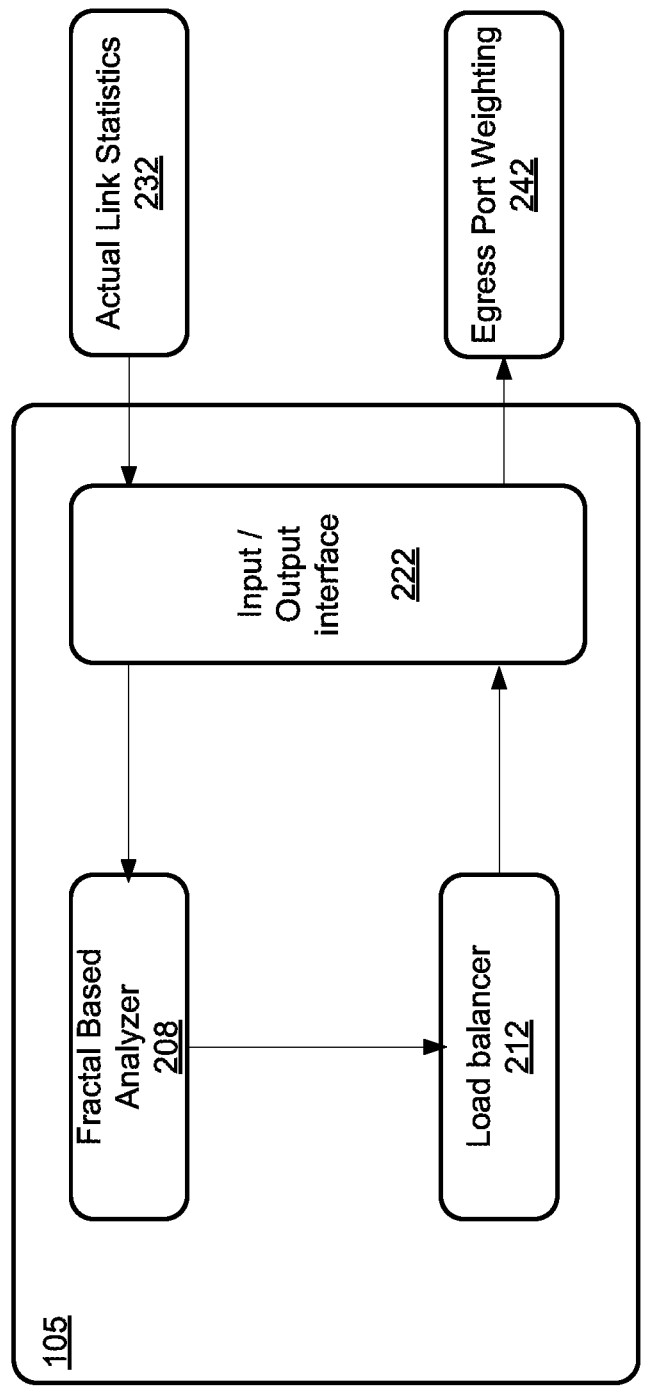
FIG. 2C is a block diagram of one embodiment of a controller.

FIG. 2C is a block diagram of one embodiment of a controller 105. In one embodiment, controller 105 balances a load at egress ports of a network device 104 based on predicted future link statistics for the respective egress ports. The controller 105 could be used in the data center 100a of FIG. 1A, the data center 100b or FIG. 1B, but is not limited thereto. The controller 105 has fractal based analyzer 208, load balancer 212, and input/output interface 222. The fractal based analyzer 208, and load balancer 212 may be similar to the elements discussed with respect to the networking device of FIG. 2A. The fractal based analyzer 208, and load balancer 212 may be implemented with any combination of hardware or software. Thus, the controller 105 could have a processor that executes processor executable instructions. Optionally, the controller 105 could have computer storage to store the processor executable instructions.

The controller 105 receives actual link statistics 232 via input/output interface 222. These actual link statistics 232 refer to link statistics of networking devices, such as those depicted in FIG. 1A or 1B. Actual link statistics 232 have been discussed with respect to FIG. 2B. The actual link statistics 232 could be sent from the network device for which the actual link statistics 232 pertain. Thus, in one embodiment, network devices 104 are configured to exchange actual link statistics 232. The actual link statistics 232 may be provided to the fractal based analyzer 208. Load balancer 212 may determine a suitable weighting for the egress ports of the networking device associated with the actual link statistics 232. The input/output interface 222 outputs the egress port weighting 242 either directly or indirectly to the networking device associated with the actual link statistics 232. Input/output interface 222 could be, for example, an Ethernet interface.

Figure 3A:
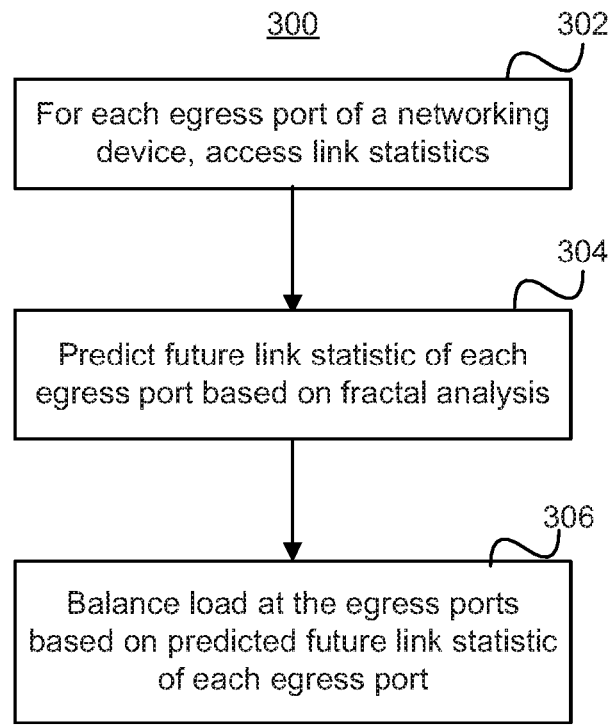
FIG. 3A is a flowchart of one embodiment of a process of load balancing based on fractal analysis.

FIG. 3A is a flowchart of one embodiment of a process 300 of load balancing based on fractal analysis. The process 300 is implemented in hardware (e.g., ASIC), in one embodiment. The process 300 is implemented by executing processor executable instructions on a processor, in one embodiment. The process 300 is implemented in part in hardware and in part by executing processor executable instructions on a processor, in one embodiment. The process 300 is implemented in a networking device 104, in one embodiment. The process 300 is implemented in a controller 105, in one embodiment.

Step 302 is to access link statistics for ports of a networking device. Step 302 refers to link statistics for various egress ports of a networking device 104, in one embodiment. Actual link statistics 232 in FIG. 2A and its discussion provides one example of link statistics that may be accessed in step 302. As noted therein, the actual link statistics 232 could include a time series. The link statistics may characterize utilization and/or traffic rate at each of the egress ports. For example, link statistics could indicate that egress port 204(1) has x percent utilization, egress port 204(2) has y percent utilization, and egress port 204(m) has z percent utilization.

Step 304 may include predicting a future link statistic for each port (e.g., egress port) based on fractal analysis. In one embodiment, a next point in the time series is predicted. The next point is the predicted future link statistics, in one embodiment. The next point is the predicted future traffic rate, in one embodiment. The next point is the predicted future link utilization, in one embodiment.

Step 306 is to balance a load at the ports based on the predicted future link statistics of each port. In one embodiment, the load balancing is on a per-flow basis. In one embodiment, the load balancing is on a per-flowlet basis. As noted already, a flowlet is defined herein as a group of packets in a flow which are separated (from the nearest other packet in the flow) by more than the largest path difference in time.

In one embodiment, the networking device 104 forwards traffic flows received on ingress ports of the networking device over egress ports of the networking device based on the predicted future link statistics (e.g., predicted traffic rate) of respective egress ports in order to balance the load.

Figure 3B:
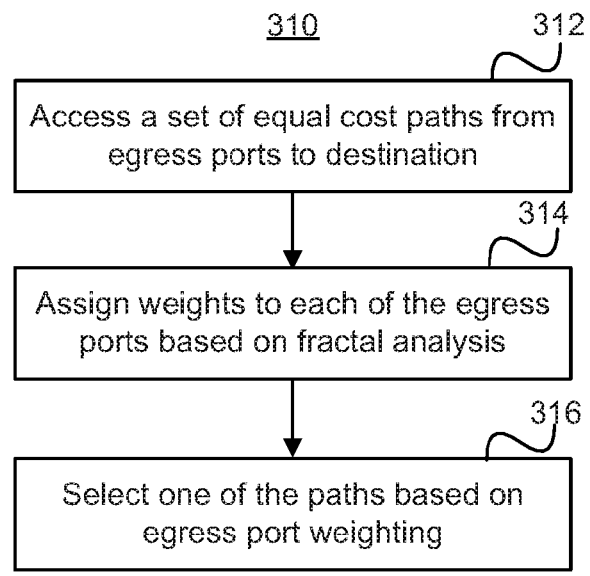
FIG. 3B is a flowchart that provides further details of one embodiment of a process of balancing a load.

In one embodiment, the controller 105 sends a load balance plan to the networking device 104 in order to balance the load at the ports of the networking device 104. The load balance plan is defined herein as a plan or scheme to distribute traffic that is received on one or more ingress (or input) ports among egress (or output) ports of a networking device. FIG. 3B is a flowchart that provides further details of one embodiment of a process 310 of balancing a load at egress ports of a networking device 104. Process 310 is one embodiment of step 306 from process 300. Process 310 is performed by the networking device 104, in one embodiment. Process 310 is performed by the control device 105, in one embodiment. In step 312 a set of equal cost paths from the network device 104 to the destination for this packet flow (or flowlet) are accessed. The equal cost paths may include a set of two or more of the egress ports 204 of the networking device 104. In one embodiment, the network device 104 has a routing/forwarding table that contains the sets of equal cost paths to each particular destination (e.g., to each server bank 110).

In step 314, a weight is assigned to each of the egress ports 204 of the set of equal cost paths based on the predicted link statistics that were determined based on the fractal analysis (see step 304 of FIG. 3A). There are numerous techniques in which the weight may be assigned. The following example assumes that there are three egress ports in the set. In one embodiment, the load balancing weights are adjusted such that the load balancing weight for egress port 1 multiplied by the predicted traffic for egress port 1 is equal to the load balancing weight for egress port 2 multiplied by the predicted traffic for egress port 2 and is equal to the load balancing weight for egress port 3 multiplied by the predicted traffic for port egress 3. In addition to this condition, the load balancing weights may be adjusted such that the total of the weights sums to "1".

In step 316, one of the equal cost paths is selected based on the egress port weighting. Stated another ways, one of the egress ports in the set from step 312 is selected. As one example, a weighted round robin technique is used in step 316 (weighted according to the port weights from step 314).

Step 316 may also include hashing, but hashing is not required. If hashing is used, some information from the packet header, such as the destination IP address, could be hashed. However, rather than simply using the hash to select the egress port, in step 316 a weighted hash approach may be performed. A weighted hash approach can increase the number of hash buckets for the egress ports, based on the weight assigned to the respective egress ports.

Although FIG. 3B describes one embodiment in which equal cost paths are used; however, the paths are not required to be equal cost. Thus, another option is for the set of paths in step 312 to include at least one path that does not have the same cost as the other paths in the set.

The link statistics are assumed to have fractal behavior, in one embodiment. This could be mono- or multi-fractal behavior. A stochastic process displays mono-fractal behavior if its statistical realization is self-similar and it characterized by a single fractal dimension. A stochastic process displays multi-fractal behavior if it is characterized by a range of fractal dimensions over various time scales.

Fractal analysis may be suitable for stochastic processes that are self-similar. Data center traffic (such as that processed by example data centers in FIGS. 1A and 1B) is one example of traffic that may be highly self-similar. Fractal analysis may be used to predict future values of stochastic processes. A variety of fractal analysis techniques may be used for embodiments of load balancing disclosed herein. Examples of fractal analysis that may be used include, but are not limited to, wavelet based fractal analysis, a fractionally autoregressive integrated moving average (FARIMA) based fractal analysis, a Weiner-Hopf based fractal analysis, or a Kalman filter based fractal analysis.

Figure 4A:
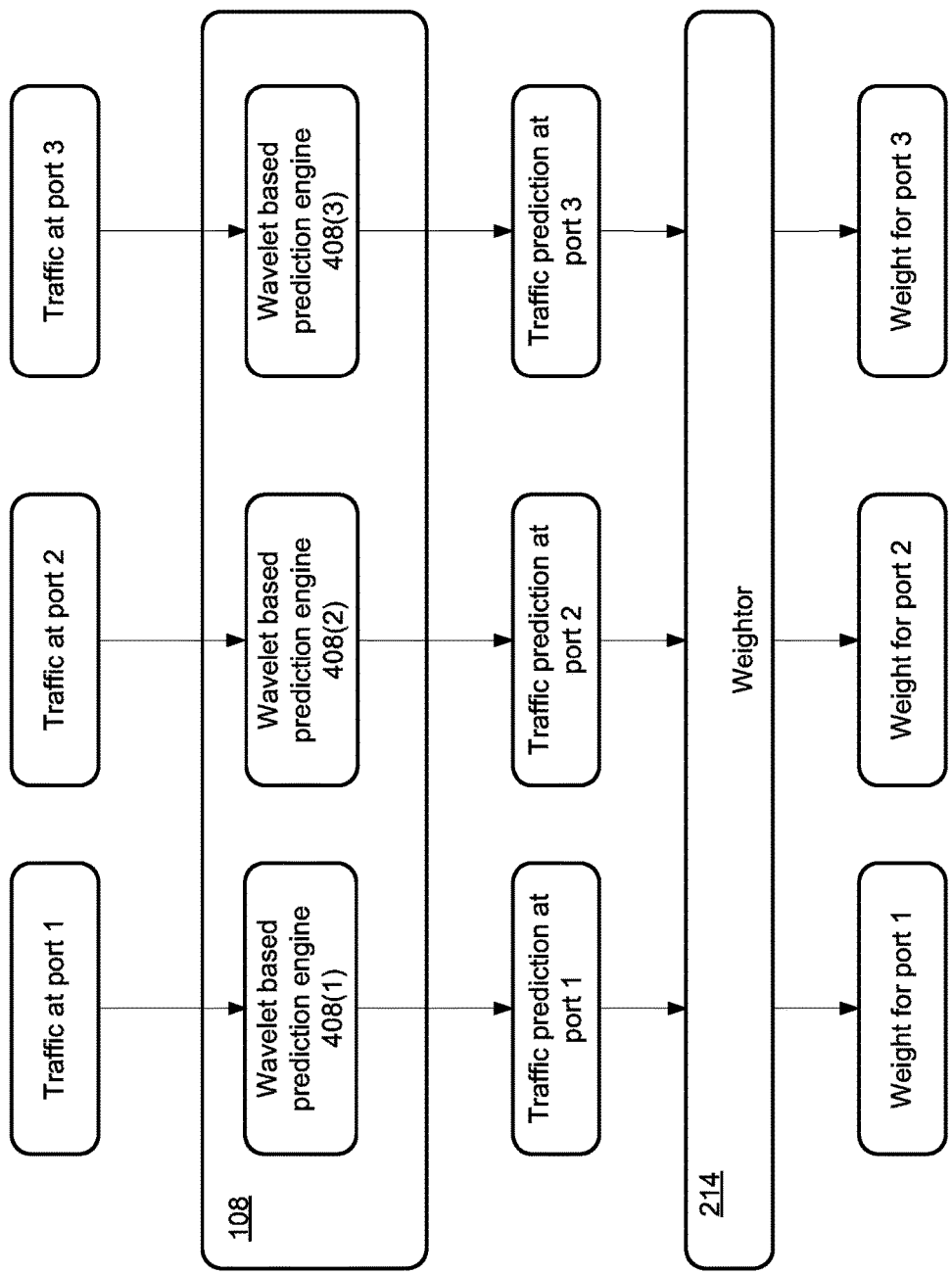
FIG. 4A is a block diagram that illustrates one embodiment of elements that may be used to perform fractal analysis based on wavelet decomposition on traffic at ports of a network device and determine a load balancing plan therein.

In one embodiment, a wavelet transform is used to decompose the time series. Thus, a wavelet transform may be used for time series analysis and forecasting. FIG. 4A is a block diagram that illustrates one embodiment of elements that may be used to perform fractal analysis on traffic at ports of a network device 104 and determine a load balancing plan thereon. The diagram includes a fractal based analyzer 108 that inputs traffic for each of several ports of a networking device. The traffic for each port is time series data, in one embodiment. For example, the traffic may be the actual link statistics 232, as shows in FIG. 2B. Fractal analyzer 108 has a wavelet based prediction engine 408(1)-408(3) for the time series data from each port.

The fractal based analyzer 108 is configured to perform a wavelet based fractal analysis on each time series. Based on the wavelet based fractal analysis, a prediction of the next point in the time series may be predicted. Each of the wavelet based prediction engines 408(1)-408(3) outputs a traffic prediction for the respective port. The traffic prediction could predict a traffic rate, a link utilization, etc. Thus, the traffic prediction is one example of a predicted link statistic.

In one embodiment, each wavelet based prediction engine 408(1)-408(3) includes a fractal model. The fractal model for a wavelet based prediction engine may include wavelet coefficients and prediction coefficients. The wavelet coefficients may be generated by performing a wavelet transform on the time series of traffic data. The fractal model may have a prediction coefficient for each wavelet coefficient. The prediction coefficient may be used to predict the next wavelet coefficient. Further details are discussed below.

Each of the traffic predictions (Traffic prediction at port 1, Traffic prediction at port 2, Traffic prediction at port 3) are input to weightor 214. Weightor determines a load balancing weight for each port, based on the traffic predictions. In one embodiment, the load balancing weights are adjusted such that the load balancing weight for port 1 multiplied by the predicted traffic for port 1 is equal to the load balancing weight for port 2 multiplied by the predicted traffic for port 2 and is equal to the load balancing weight for port 3 multiplied by the predicted traffic for port 3. In addition to this condition, the load balancing weights may be adjusted such that the total of the weights sums to "1".

The wavelet prediction engines 408 and the weightor 214 could be used in a networking device 104 or controller 105. The wavelet prediction engines 408 and weightor 214 may be implemented in hardware or software.

Figure 4B:
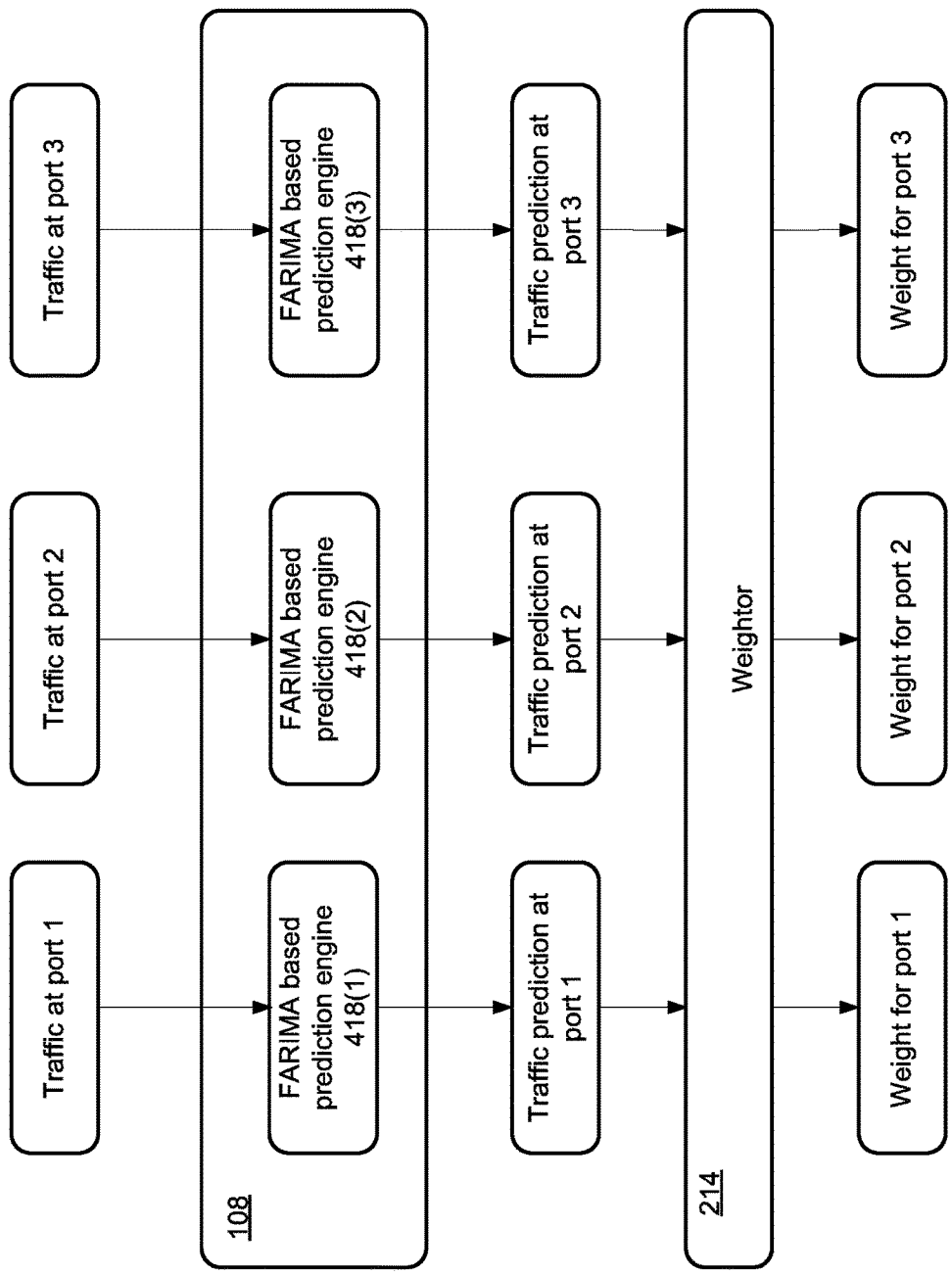
FIG. 4B is a block diagram that illustrates one embodiment of elements that may be used to perform fractal analysis based on FARIMA.

As noted above, a wavelet based prediction engine 408 is one example of how to perform a fractal analysis. However, other fractal based techniques may be used. FIG. 4B is a block diagram that illustrates one embodiment of elements that may be used to perform fractal analysis based on FARIMA. The diagram includes a fractal based analyzer 108 having FARIMA based prediction engines 418(1)-418(3) that each input traffic statistics from one of several ports of a networking device. The FARIMA based prediction engines 418 performs a FARIMA based analysis of the port traffic. Other than the different type of fractal analysis, operation may be similar to the wavelet based prediction engines 408 of FIG. 4A.

The FARIMA based prediction engines 418 may include a FARIMA model. The FARIMA model may be based on three parts: 1) fractional differentiation d; 2) autoregressive part p; and 3) moving average part q. In one embodiment the fractional differentiation parameter "d" is selected based on a self-similarity parameter (e.g., Hurst exponent (H)). In one embodiment, d is established at H-0.5.

Figure 5:
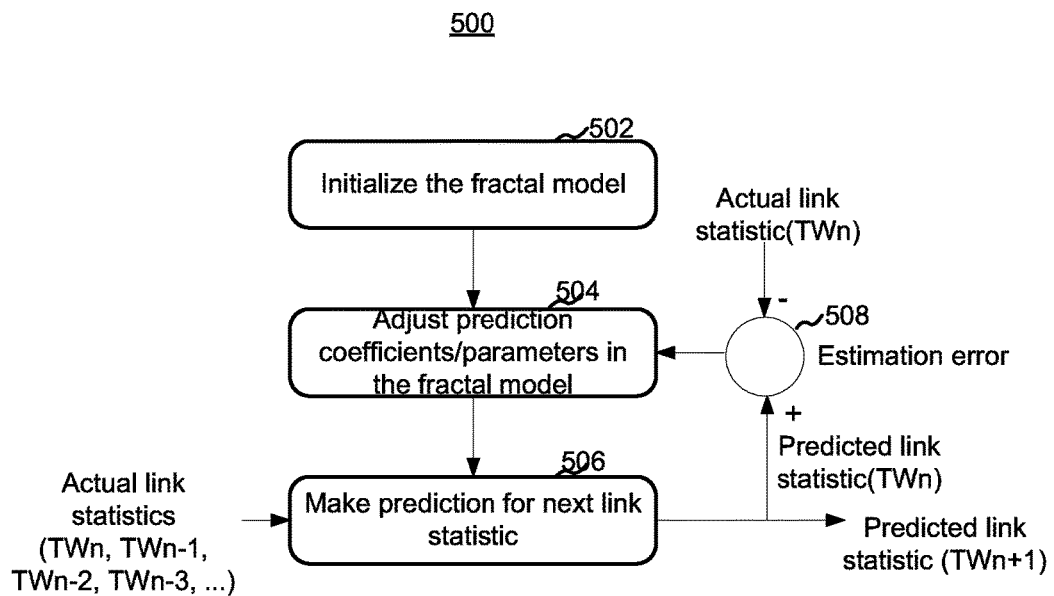
FIG. 5 is flowchart that provides further details of one embodiment of a process of predicting future link statistics based on fractal analysis.

FIG. 5 is flowchart that provides further details of one embodiment of a process 500 of predicting future traffic based on fractal analysis. The process 500 is one embodiment of steps 304 of process 300. The process 500 may be used separately for each port being analyzed. The process 500 inputs actual link statistics (TWn, TWn-1, TWn-2, TWn-3, ... ). The actual link statistics are for a present time window (TWn) and past time windows. Steps of process 500 are not necessarily performed in the listed order.

The process 500 may be used with many fractal based techniques including, but not limited to, a wavelet based prediction engine 408, a FARIMA based prediction engine 418, a Weiner-Hopf based prediction engine, or a Kalman filter based prediction engine.

In step 502, a fractal model is initialized. The fractal model may have a number of coefficients. For example, a wavelet based fractal model may have prediction filters. Step 502 may include establishing initial values for coefficients for the prediction filters. A FARIMA based fractal model may have parameters p, d, and q, as discussed above. Step 502 may include establishing values for p, d, and q. Other parameters and/or coefficients can be initialized in step 502. The foregoing is just for the sake of illustration.

Step 504 includes adjusting the fractal model coefficients and/or parameters. The adjustment may be made based on an estimation error (see step 508), which will be discussed below.

Step 506 includes making a prediction for the next value of the link statistic based on the fractal analysis. This step results in a predicted link statistic for the next time window (TWn+1). In other words, step 506 may predict the next value in a time series of the actual link statistics for the time periods (TWn, TWn−1, TWn−2, TWn−3, . . . ). Note that here the time series is listed in reverse chronological order.

As noted above, step 504 includes adjusting the fractal model coefficients and/or parameters. This adjustment is made based on an estimation error made in step 508. In one embodiment, the estimation error compares a predicted value of the link statistic with an actual value of the link statistic. In this example, the comparison uses the predicted value for time window TWn and compares it with the actual value for time window TWn.

Rather than estimating the error based on the predicted and actual link statistics, the error could be estimated based on something else that the fractal analysis predicts. Thus, it is possible to modify process 500. An example modification will be discussed below with respect to FIG. 6.

Figure 6:
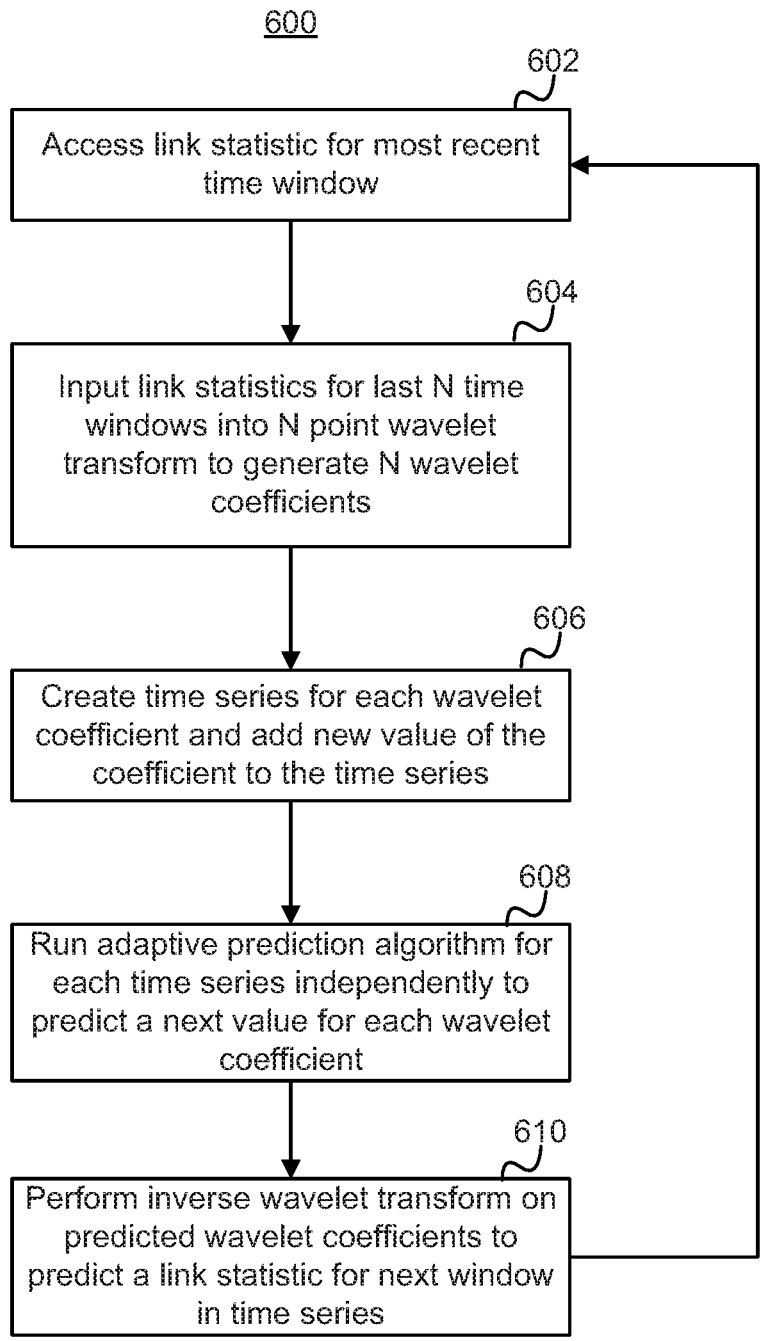
FIG. 6 is flowchart that provides further details of one embodiment of a process of wavelet based prediction engine in load balancing.

FIG. 6 is flowchart that provides details of one embodiment of a process 600 of predicting a next link statistic using a wavelet based fractal analysis. This process 600 could be used by wavelet based prediction engine 408. This flowchart provides further details for step 506 of FIG. 5. Thus, the process 600 can be performed in parallel for the different ports of one of the networking devices 104. To help illustrate the discussed, process 600 will be discussed with respect to port 1.

In step 602, link statistics are accessed for a most recent time window. For example, referring to FIG. 2A, Link Stat W5 is accessed for Time Window 5 for port 1. Note that an assumption is made here that link statistics have already been accessed for earlier time windows such as Time Windows 1-4. Furthermore, note that the time series of actual link statistics 232 might not be amenable to standard statistical tools. As will be seen below, the wavelet transform will provide a way to better analyze the time series.

Step 604 includes inputting the measurements (e.g., Link Stats) for the last N time windows into an N point wavelet transform. A result of step 604 is to generate N wavelet coefficients. These five wavelet coefficients may be referred to as Wn,0; Wn,1; Wn,2; Wn,3; . . . Wn,N−1 for an N point wavelet transform. For example, if there are five time windows, then five wavelet coefficients Wn,0; Wn,1; Wn,2; Wn,3; and Wn,4 may be generated for this input. The example of five time windows is just for illustration; there could be more or fewer time windows.

Step 606 includes updating a time series for each wavelet coefficient. Each of the time series may be based on past values of the N wavelet coefficients. Step 606 may include adding the new value (Wn,0, etc.) of the wavelet coefficient to the time series. Step 606 replaces the time series of actual link statistics 232 with a collection of better behaved sequences (based on the N wavelet coefficients) that are more amenable to standard statistical tools.

Step 608 includes running an adaptive prediction algorithm for each time series independently in order to predict a next value for each wavelet coefficient. For example, Wn+1,0; Wn+1,1; Wn+1,2; Wn+1,3; . . . Wn+1,N−1 may be predicted in step 608.

Step 608 may include applying a separate prediction filter ($h_{n,i}$) to each of the wavelet coefficients. Equation 1 may be used to predict the next wavelet coefficient $W_{n+1}$ base on previous wavelet coefficients.

$$W_{n+1,i} = \sum_{k=0}^{M-1} h_{n,1}(k) W_{n-k,i} \qquad (1)$$

Step 608 may be applied to the each of the N wavelet coefficients (e.g., Wn+1,0; Wn+1,1; Wn+1,2; Wn+1,3; . . . Wn+1,N−1).

Step 610 includes performing an inverse wavelet transform on the predicted values of the N wavelet coefficients. For example, step 610 may perform an inverse wavelet transform on the predicted values of the N wavelet coefficients (e.g., Wn+1,0; Wn+1,1; Wn+1,2; Wn+1,3; . . . Wn+1, N−1). The predicted link statistic for the next window in the time series may be derived from the inverse wavelet transform on the predicted values of the N wavelet coefficients.

The process 600 then returns to step 602 to access the link statistic for the next time window. The "N" time windows in step 604 will be shifted forward in time by one time window.

Process 600 does not expressly mention dynamically adjusting the coefficients of the fractal model (see step 508 of FIG. 5). In one embodiment, coefficients for the prediction filter ($h_{n,i}$) are dynamically adjusted. This may be based on a comparison of the predicted value of the wavelet coefficient with the actual value of that wavelet coefficient that was generated by the N point wavelet transform. Thus, step 508 of FIG. 5 could be modified by replacing the inputs to the estimation error comparison accordingly.

Figure 7:
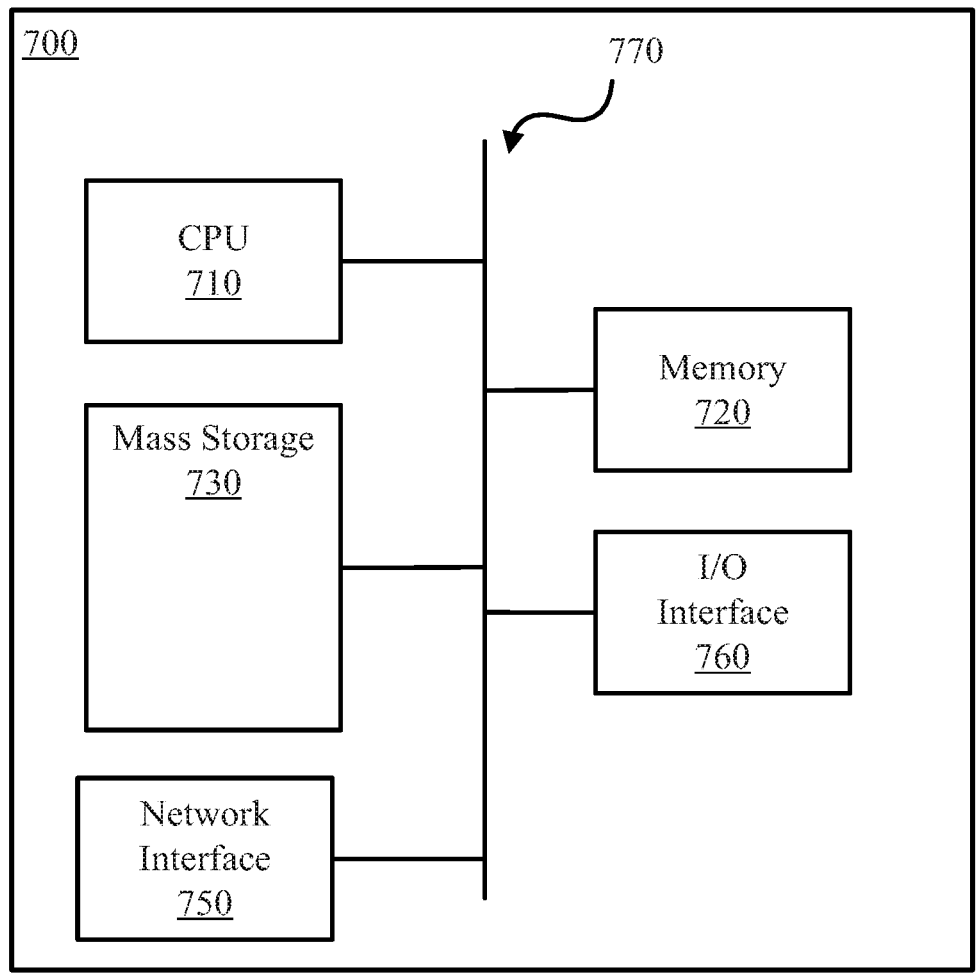
FIG. 7 illustrates a block diagram of a network system that can be used to implement various embodiments.

FIG. 7 illustrates a block diagram of a processing unit 700 that can be used in part to implement various embodiments. Processing unit 700 could be used within a networking device 104 such as, first tier networking device 104(1), second tier networking device 104(2), third tier networking device 104(3). Processing unit 700 could be used within a controller 105. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing unit 700 may comprise one or more input/output devices, such as network interfaces, storage interfaces, and the like. The processing unit 700 may include a central processing unit (CPU) 710, a memory 720, a mass storage device 730, and an I/O interface 760 connected to a bus 770. The bus may be one or more of any type of several bus architectures including a memory bus or memory controller, a peripheral bus or the like.

The CPU 710 may comprise any type of electronic data processor, which may be configured to read and process instructions stored in the memory 720. The memory 720 may comprise any type of system memory such as static random access memory (SRAM), dynamic random access memory (DRAM), synchronous DRAM (SDRAM), read-only memory (ROM), a combination thereof, or the like. In an embodiment, the memory 720 may include ROM for use at boot-up, and DRAM for program and data storage for use while executing programs. In embodiments, the memory 720 is non-transitory. The mass storage device 730 may comprise any type of storage device configured to store data, programs, and other information and to make the data, programs, and other information accessible via the bus. The mass storage device 730 may comprise, for example, one or more of a solid state drive, hard disk drive, a magnetic disk drive, an optical disk drive, or the like.

The processing unit 700 also includes one or more network interfaces 750, which may comprise wired links, such as an Ethernet cable or the like, and/or wireless links to access switches, servers, or one or more networks. In an embodiment, the processing unit 700 is coupled to a local-area network or a wide-area network for data processing and communications with remote devices, such as other processing units, the Internet, remote storage facilities, or the like.

In an example embodiment, an apparatus is used to load balance link utilization. The apparatus includes a fractal based analyzer element that predicts a traffic rate for each of the plurality of egress ports based on recent traffic rates at the respective egress ports. The apparatus includes a load balancer element that forwards the traffic flows received on the plurality of ingress ports over the plurality of egress ports based on the predicted traffic rate of the respective egress ports. The apparatus may further include a link statistics collector element that determines the recent traffic rates for each of the egress ports for each of a plurality of recent time periods that each have an equal time length. In some example embodiments, the apparatus may further include one or more elements for performing any one or combination of steps described in the embodiments.

In accordance with various embodiments of the present disclosure, the methods described herein may be implemented using a hardware computer system that executes software programs. Further, in a non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus comprising:
logic configured to:
    access link statistics for a plurality of time periods, wherein separate link statistics are accessed for each of a plurality of egress ports of a networking device;
    predict a future link statistic for each of the plurality of egress ports based on a separate fractal analysis of the link statistics for each of the egress ports; and
    balance a load at the plurality of egress ports based on the predicted future link statistic for the respective egress ports.

2. The apparatus of claim 1, wherein the logic is further configured to determine a load balancing weight for each of the plurality of egress ports based on the predicted future link statistic for the respective egress ports.

3. The apparatus of claim 2, wherein the apparatus comprises the plurality of egress ports, and further comprises a plurality of ingress ports that are configured to receive traffic flows; and
    wherein the logic is further configured to select ones of the egress ports for the traffic flows based on the load balancing weight for each of the plurality of egress ports.

4. The apparatus of claim 2, wherein the apparatus comprises the plurality of egress ports, and further comprises a plurality of ingress ports that are configured to receive traffic flows;
    wherein the logic is further configured to:
        determine flowlets in the traffic flows; and
        select ones of the egress ports for the flowlets based on the load balancing weight for each of the plurality of egress ports.

5. The apparatus of claim 1, wherein the accessed link statistics for each egress port are organized as a time series, wherein the logic is further configured to predict a next value for each time series, the next value being the future link statistic prediction for the respective egress port.

6. The apparatus of claim 5, further comprising:
an input configured to receive the time series for each of the plurality of egress ports, each time series comprising a link statistic for each of a plurality of recent time windows; and
an output configured to provide a load balancing weight for each of the plurality of egress ports for a time window that immediately follows the recent time windows.

7. The apparatus of claim 1, wherein the accessed link statistics for the respective egress ports for the plurality of time periods comprise a traffic rate for each of the respective egress ports for each of the plurality of time periods.

8. The apparatus of claim 1, wherein the accessed link statistics for the respective egress ports for the plurality of time periods comprise a link utilization for each of the respective egress ports for each of the plurality of time periods.

9. The apparatus of claim 1, wherein to balance the load at the plurality of egress ports based on the predicted future link statistic for the respective egress ports the logic is configured to:
receive the link statistics from the networking device; and
send a load balancing plan to the networking device.

10. A method of load-balancing, comprising:
accessing link statistics for a plurality of egress ports of a networking device, the link statistics for each of the egress ports based on traffic rates at the respective egress port for each of a plurality of recent time periods;
predicting a future link statistic for each of the plurality of egress ports by applying a separate fractal analysis to the link statistics for each of the egress ports, wherein the future link statistic is for a time period that immediately follows the plurality of recent time periods; and
balancing a load at the plurality of egress ports based on the predicted future link statistic for each of the plurality of egress ports.

11. The method of claim 10, wherein the balancing a load comprises:
weighting each of the plurality of egress ports inversely based on the predicted future link statistic.

12. The method of claim 11, further comprising:
selecting one of the egress ports to forward a packet flow that is received at an ingress port of the networking device, wherein the selecting is based on the weighting.

13. The method of claim 11, further comprising:
selecting one of the egress ports to forward a flowlet of a packet flow that is received at an ingress port of the networking device, wherein the selecting is based on the weighting.

14. The method of claim 10, wherein the link statistics are organized as a time series for each of the plurality of egress ports, wherein the predicting a future link statistic comprises predicting a next value for each time series, the next value being the future link statistic for the respective egress port.

15. The method of claim 10, wherein the link statistics for each of the plurality of egress ports comprise a value for a traffic rate for each of a plurality of time windows having the same time length, wherein the predicting a future link statistic comprises predicting a value for the traffic rate for a time window having the same length as the plurality of time windows and that immediately follows the plurality of time windows.

16. The method of claim 10, wherein the accessing link statistics comprises:
determining link utilization at an access switch in a data center, wherein the access switch has a plurality of ingress ports configured to receive traffic flows from a plurality of servers and forward the traffic flows on the plurality of egress ports.

17. A networking device, comprising:
a plurality of ingress ports configured to receive traffic flows;
a plurality of egress ports;
fractal based analyzer logic configured to predict a traffic rate for each of the plurality of egress ports based on recent traffic rates at the respective egress ports; and
load balancer logic configured to forward the traffic flows received on the plurality of ingress ports over the plurality of egress ports based on the predicted traffic rate of the respective egress ports.

18. The networking device of claim 17, wherein the load balancer logic is further configured to:
assign a load balancing weight to each of the plurality of egress ports according to the predicted traffic rate of the respective egress ports, wherein egress ports having a lower predicted future traffic rate are assigned a higher load balancing weight and egress ports having a higher predicted future traffic rate are assigned a lower load balancing weight; and
forward the traffic that is received on the plurality of ingress ports over the plurality of egress ports based on the load balancing weights assigned to the respective egress ports.

19. The networking device of claim 17, wherein the recent traffic rates for each of the respective egress ports comprises a time series having a traffic rate for each of a plurality of points in the time series, wherein the fractal based analyzer logic is configured to predict a next traffic rate in each of the time series, the next traffic rate being the predicted traffic rate.

20. The networking device of claim 17, further comprising:
a link statistics collector configured to determine the recent traffic rates for each of the egress ports for each of a plurality of recent time periods that each have an equal time length.

21. The networking device of claim 17, wherein the fractal based analyzer logic is configured to process the recent traffic rate of the respective egress ports using one or more of:
a wavelet based prediction engine, a fractionally autoregressive integrated moving average (FARIMA) based prediction engine, a Weiner-Hopf based prediction engine, or a Kalman filter based prediction engine.

* * * * *